DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 9

T901,015

PHOTOSENSITIVE ELEMENTS FOR COLOR DIFFUSION TRANSFER SYSTEMS HAVING REDUCED PRESSURE SENSITIVITY

Edward J. Seus, Kodak Park Works,
Rochester, N.Y. 14650

Filed Jan. 12, 1972, Ser. No. 217,266
Int. Cl. G03c *1/40, 5/54*
U.S. Cl. 96—77
No Drawing. 13 Pages Specification

The pressure sensitivity of a color diffusion transfer system employing direct-positive, silver halide emulsions is reduced by adding to at least one of the silver halide emulsion layers prior to coating, a dispersion of a substantially water-insoluble, high boiling, nonpolymeric material generally known as a coupler solvent in a hydrophilic colloid such as gelatin. The dye image-providing material is preferably a "Fischer-type" nondiffusible coupler having an acidic solubilizing group thereon such as a sulfonic acid group, the coupler being capable of reacting with oxidized aromatic primary amino color developing agent to produce a diffusible dye. The direct-positive, silver halide emulsion is preferably an internal-image emulsion wherein the silver halide forms latent images predominantly inside the silver halide grains. The nonpolymeric solvent has a boiling point above about 175° C. and is present at a concentration of from about 5 to about 150 mg. per square foot of photosensitive element. Examples of such materials include tricresyl phosphate, n-butyl phthalate and ethyl-N,N-di-n-butyl carbamate. A reduction in pressure sensitivity of the photosensitive element enables it to be subjected to stress conditions in a camera such as making a 180° direction change over a small roller without loss of speed or maximum dye densities.